United States Patent [19]

Mink

[11] 4,363,395

[45] Dec. 14, 1982

[54] MATERIAL HANDLING DEVICE

[76] Inventor: George Mink, 38296 Horseshoe Dr., Mt. Clemens, Mich. 48043

[21] Appl. No.: 185,986

[22] Filed: Sep. 10, 1980

[51] Int. Cl.³ .............................................. B65G 25/00
[52] U.S. Cl. ................................................... 198/486
[58] Field of Search ............... 198/486, 430, 427, 653, 198/894–896; 414/750–753, 225, 226; 83/277, 417

[56] References Cited

U.S. PATENT DOCUMENTS

| | | | |
|---|---|---|---|
| 3,075,651 | 1/1963 | Kaden | 414/753 X |
| 3,655,070 | 4/1972 | Haydu | 198/486 X |
| 3,751,997 | 8/1973 | Owen, Jr. et al. | 414/750 X |
| 3,834,213 | 9/1974 | Henzler et al. | 414/225 X |

*Primary Examiner*—John J. Love
*Assistant Examiner*—Paul A. Sobel
*Attorney, Agent, or Firm*—Harness, Dickey & Pierce

[57] ABSTRACT

A material handling device for moving work pieces successively between adjacent work stations. The device includes a plurality of grippers, each supported on a common member. Each gripper is operative between a gripping position for gripping a work piece and a released position for depositing the work piece. A motion transfer device is incorporated for moving the grippers and their supporting member from a home position to a position where the grippers are each juxtaposed to a work station whereby the work piece in that station may be grasped. Once the work pieces are gripped, the motion transfer device moves the grippers and the supporting member to another position wherein each work piece will be positioned at to the next adjacent work station. The grippers are then released so that the work piece will be deposited and the grippers and their supporting member are returned to the home position.

6 Claims, 4 Drawing Figures

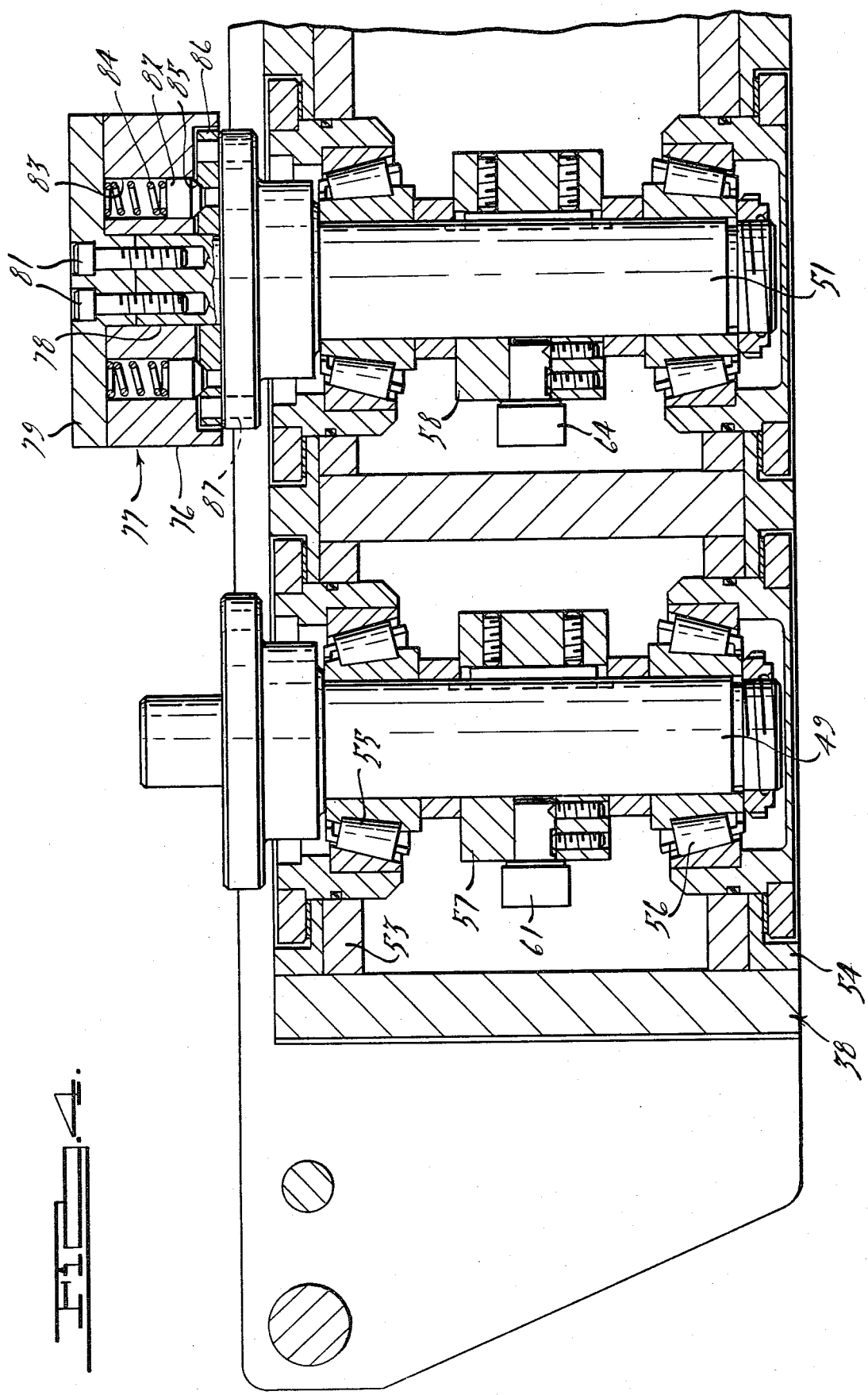

MATERIAL HANDLING DEVICE

BACKGROUND OF THE INVENTION

This invention relates to a material handling device and more particularly to an improved material handling device for moving a plurality of work pieces between adjacent work stations and an improved supporting and actuating device therefor.

In numerous work piece forming operations it is desirable to have a device that is capable of moving a work piece from one station to another. My U.S. Pat. Nos. 3,972,422, entitled Material Handling Apparatus, issued Aug. 3, 1976; 4,002,245, entitled Material Handling Apparatus, issued Jan. 11, 1977; 4,139,104, entitled Material Handling Apparatus, issued Feb. 13, 1979; and my co-pending patent application entitled Material Handling Apparatus, Ser. No. 77,768 filed Sept. 21, 1979, all illustrated devices that are particularly adapted for moving a work piece from one station to another. In many instances, however, successive work stations are juxtaposed to each other and it is desirable to provide a device which will automatically move work pieces from one station to the next. Although such devices have been proposed, they have been limited in application to certain industries and have not offered versatility for a wide number of applications. In many instances the handling devices proposed have not offered sufficient degrees of freedom in their movement so as to traverse a wide enough path to offer use in a variety of applications. Furthermore, many of these devices position the gripping mechanism directly at the work station during the dwell period and thus would interfere with application to a variety of uses.

It is, therefore, a principle object of this invention to provide an improved material handling device for moving work pieces between successive work stations.

It is another object of this invention to provide a material handling device herein the gripping means is moved through a relatively wide path so that application to a variety of uses is possible.

It is another object of this invention to provide a material handling device wherein the gripping means are positioned out of registry with the work station when the device is in its home position so as to not interfere with the operating steps being performed at the individual work stations.

It is another object of this invention to provide an improved motion transfer mechanism for a material handling device that provides movement in two senses and effectively permits such movement for a relatively long supporting member.

SUMMARY OF THE INVENTION

A first embodiment of this invention is adapted to be employed in a material handling device for moving work pieces in succession between a plurality of adjacent work stations. The material handling device comprises a plurality of gripping means each adapted to selectively grip and release a work piece. The gripping means are all affixed to a supporting element. Motion transfer means are provided for moving the supporting element and the gripping means carried thereby between a home position in which the gripping means are positioned free of the work stations, to a first position in which the gripping means are juxtaposed to the work stations so that a work piece at the stations may be gripped, to a second position in which each of the gripping means is juxtaposed to the next adajacent work station so that the work piece gripped thereby may be deposited and back to the home position.

Another feature of the invention is adapted to be embodied in a material handling device including gripping means and a support element as defined in the preceding paragraph. In connection with this feature, the motion transfer means is effective to move the supporting element and the gripping means carried thereby in a first sense between a first extreme position and a second extreme position. The motions transfer means is also effective to move the supporting element and the gripping means carried thereby in a second sense from a first extreme position to a second extreme position. Timing means are incorporated in the motion transfer means so that the senses of movement transmitted to the gripping means and the supporting element result in a motion that permits a work piece to be picked up at one work station and transferred through movement in the two senses to the next adjacent work station.

A still further feature of the invention is adapted to be embodied in a material handling device that includes a plurality of gripping means and a supporting element that carries the gripping means. The support element is itself supported for movement in a first sense relative to a supporting member and by this supporting member. The supporting member is itself supported for movement in another sense. First cam means comprising spaced first and second cams and a pair of cooperating follower elements are interconnected to the supporting member for actuating the supporting member in its permitted sense of movement. A third cam is interposed between the first and second cams and a follower interconnects this cam with the supporting element for moving the supporting element in its permitted sense of movement relative to the supporting member. The cams are all driven in unison so that the gripping means will be moved in a sequence so that a work piece may be picked up from a work station by each of the gripping means and transferred to the next adjacent work station.

BRIEF DESCRIPTION OF THE DRAWINGS

FIG. 4 is a partial cross-sectional view taken generally along the line 4—4 of FIG. 3.

DETAILED DESCRIPTION OF THE PREFERRED EMBODIMENT

Figure 1:
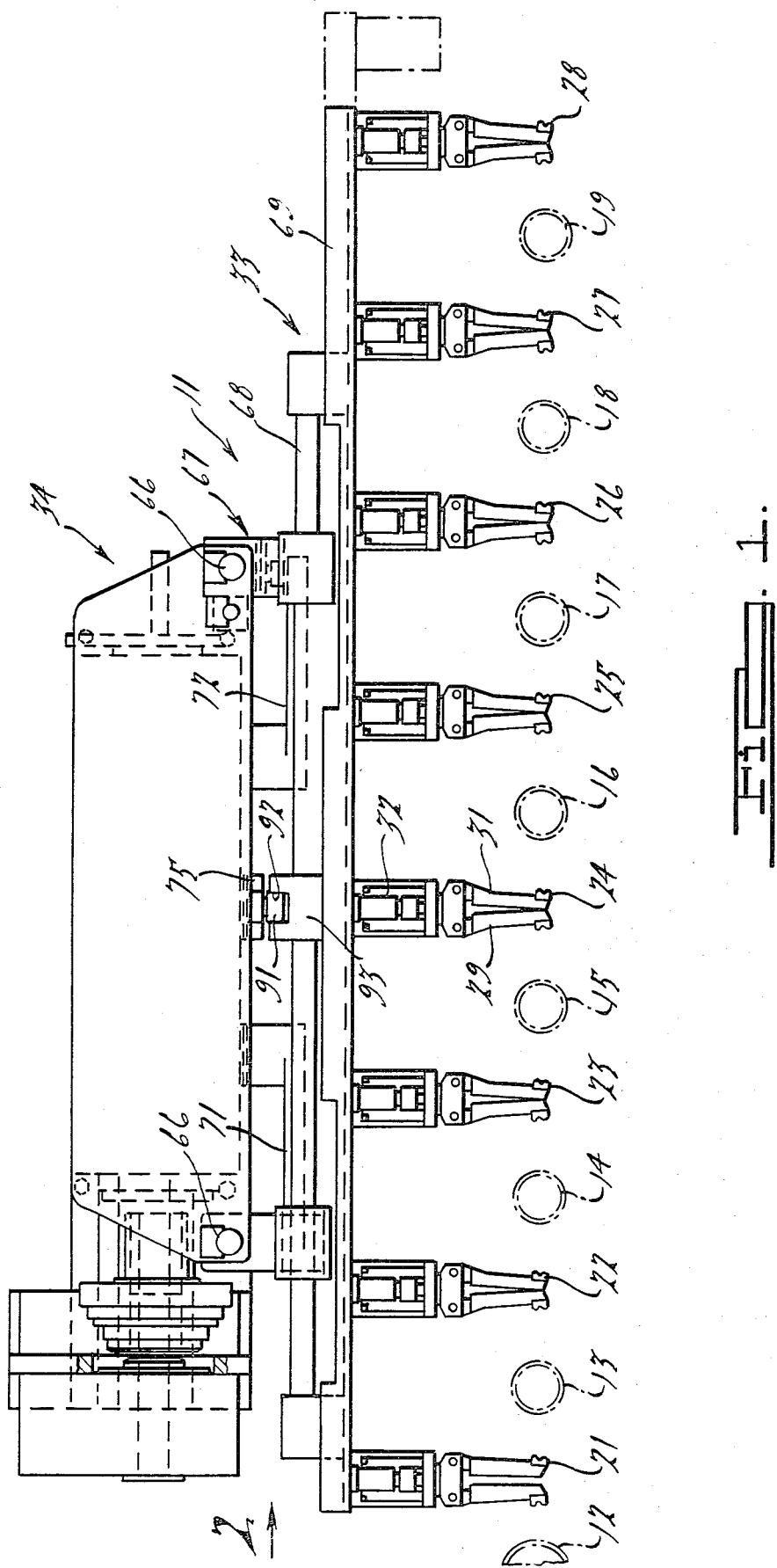
FIG. 1 is a top plan view of a material handling device embodying this invention and showing the device in its home position.

A material handling device constructed in accordance with an embodiment of this invention is indentified generally by the reference numeral 11 in the drawings. The material handling device is adapted to move work pieces in sequence from one work station to a next adjacent work station. In FIG. 1 the work pieces are shown in phantom and are positioned at stations 12, 13, 14, 15, 16, 17, 18 and 19. It is to be understood that various operations may be performed on the work pieces in each of the stations 12 through 19, and/or certain of these stations may be dwell stations. A station at one end of the apparatus may comprise a feeding station wherein work pieces are initially delivered to the associated apparatus. A station at the opposite end may serve as a location where work pieces which have had all desired operations performed can be discharged.

The material handling apparatus includes a number of gripping devices 21, 22, 23, 24, 25, 26, 27 and 28. Each gripping device is the same construction and comprises a pair of pivoted jaws 29 and 31 which are actuated between a gripping position and release position in any known manner such as by means of a pneumatic or hydraulically actuated cylinder 32. The construction of the gripping devices 21 through 28 has not been described in any more detail because it does not form the substance of the invention and any known type of gripping device may be employed at each station. Also the gripping devices from station to station may vary slightly so as to accommodate the operations which have been performed on the work pieces at the respective stations 12 through 19.

The gripping devices 21 through 28 are carried by a supporting assemblage, indicated generally by the reference number 33. As will become apparent, this supporting assemblage permits the gripping devices 21 through 28 to be moved sequentially from the illustrated home position of FIG. 1 wherein each of the gripping devices 21 through 28 is disposed between adjacent of the work stations 12 through 19, to a first position wherein work pieces at the station may be gripped and through a path that has two senses of freedom or movement to a position where the work pieces may be deposited at the next adjacent work station. The gripping devices 21 through 28 are then returned back to their home position. In order to achieve the desired degree of movement, a cam assemblage, indicated generally by the reference numeral 34, is provided which cooperates with follower mechanisms to be described and which form a portion of this cam mechanism 34. The cam mechanism 34 is driven by means of a driving motor and gear train, indicated generally by the reference number 35.

Figure 3:
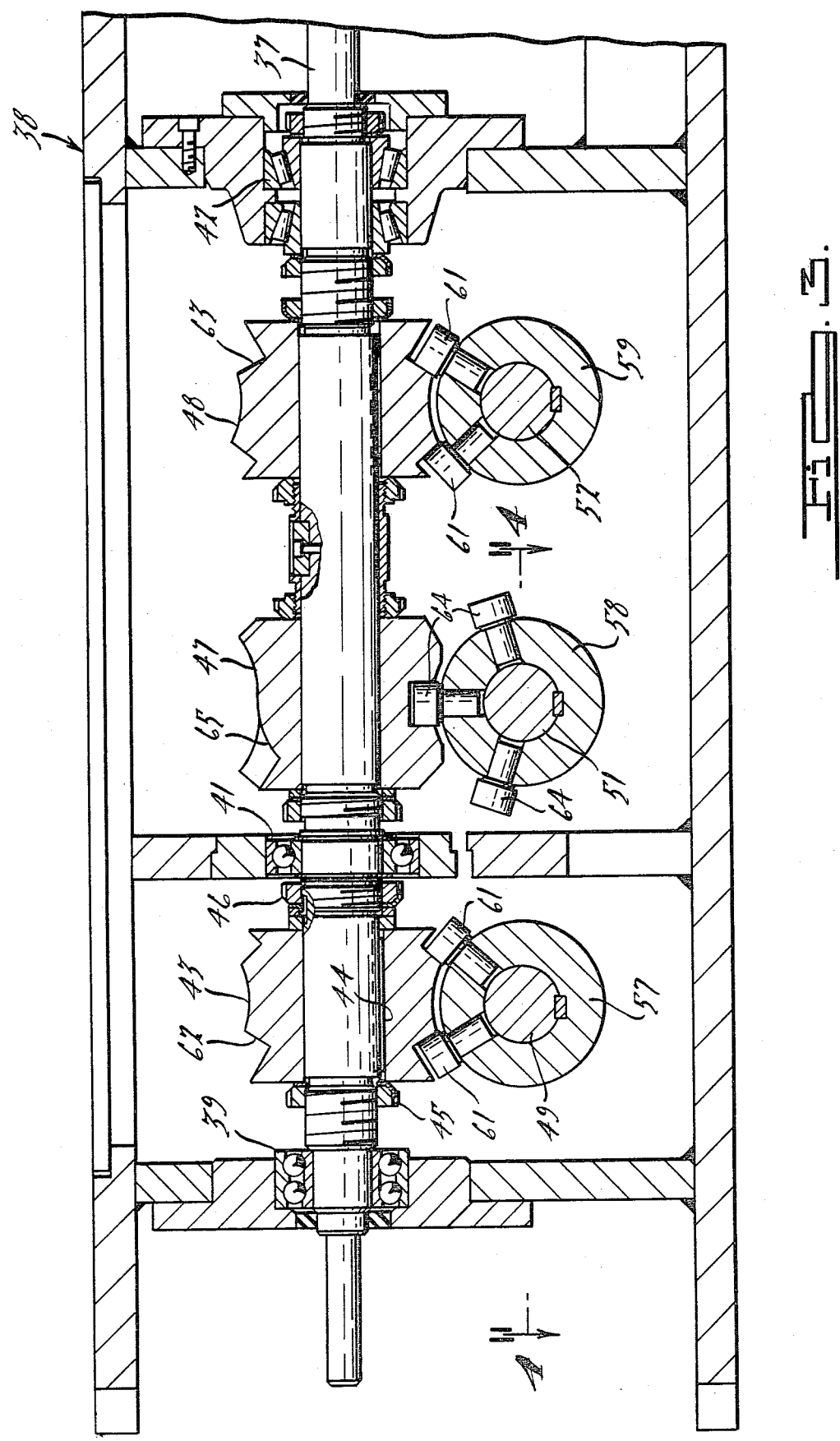
FIG. 3 is a cross-sectional view taken generally along the line 3—3 of FIG. 2.

The motor 35 has a output shaft 36 which is coupled by a suitable gear mechanism such as a work and worm wheel (not shown) to a cam shaft 37, shown in most detail in FIG. 3. The cam shaft 37 is supported for rotation in a housing 38 by means of axially spaced bearings 39, 41 and 42. A roller cam 43 is affixed to one end of the cam shaft 37 between the bearings 39 and 41 in any suitable manner including a key and keyway 44 and nuts 45 and 46. Second and third roller cams 47 and 48 are affixed to the cam shaft 37 between the bearings 41 and 42. A similar arrangement is incorporated for fixing the roller cams 47 and 48 axially on the cam shaft 37 and against rotation relative to it.

Supported in the housing 38 for oscillation about axes perpendicular to and offset from the axis of rotation of the camshafts 37 are three follower shafts 49, 51 and 52. The support for the follower shafts may be best understood by reference to FIG. 4 wherein only the construction associated with the shafts 49 and 51 has been illustrated. It is to be understood that the shaft 52 is supported in a similar manner. The shafts are journaled in spaced front and rear walls 53 and 54 of the housing 38 by means of bearings 55 and 56, respectively. Follower assemblies 57, 58 and 59 are affixed to the follower shafts 49, 51 and 52 respectively. The follower assemblies 57 and 59 consist of a pair of spaced roller carrying pins 61 that are each fixed to a hub member which is, in turn, affixed both axially and radially to the respective follower shaft. The rollers of the pins 61 coach with cam grooves 62 and 63 of the roller cams 43 and 48. Upon rotation of the cam shaft 37 the cams 43 and 48 will cause oscillation of the follower assemblages 57 and 59 and their respective follower shafts 49 and 52 about their respective axes and a dwell period. For a reason which becomes apparent, the shape of the cam grooves 62 and 63 is the same but of an opposite sense so that the oscillation of the cam shafts 49 and 52 will be the same but in an opposite sense.

The follower assembly 57 has three roller carrying pins 64 that are received in and coach with a cam groove 65 of the roller cam 47 so that rotation of the cam shaft 37 also effects oscillation of the follower assemblage 58 and follower shaft 51 about its axis and a dwell period.

Figure 2:
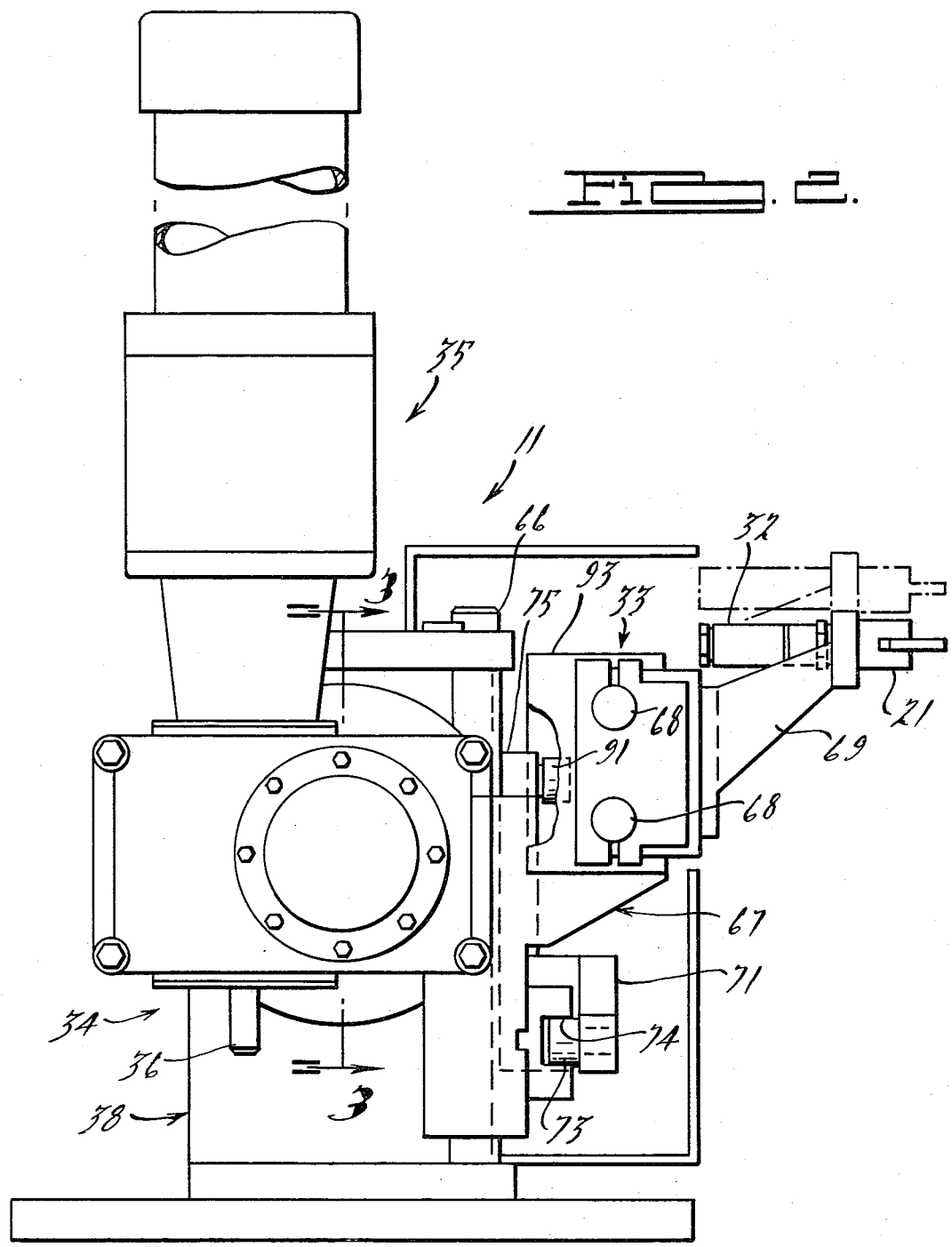
FIG. 2 is an enlarged end elevational view of the device shown in FIG. 1 and looking generally in the direction of the arrow 2 in FIG. 1.

The supporting assembly 33 will now be described by particular reference to FIGS. 1 and 2. A pair of vertically extending columns or pins 66 are affixed in any known manner relative to the housing 38. A carriage assembly, indicated generally by the reference numeral 67, is supported on the pins 66 for movement in a vertical direction along a path defined by the pins 66. The carriage assembly 67 in turn slideably supports a pair of horizontally extending shafts 68 that are disposed one above the other. A supporting element 69 to which the grippers 21 through 28 are attached, is affixed to the shafts 68 for sliding movement of the supporting element 69 and grippers 21 through 28 in a horizontal direction relative to the carriage assembly 67. In turn, the carriage assembly 67 and those elements supported by it, including the shafts 68, supporting element 69, and grippers 21 through 28 are capable of vertical movement along the pins or columns 66.

As has been noted, the cam mechanism 34 controls the movement of the carriage assembly 67 and supporting element 69. The roller cams 62 and 63, and their associated followers 57 and 59 control the vertical movement. For this purpose, crank arms 71 and 72 are affixed to the follower shafts 49 and 52 via overload release mechanisms, which are not shown in detail in the drawings but which are the same in construction as that associated with the follower shaft 51, which is illustration and will be described. These overload release mechanisms may be of the construction as disclosed in my co-pending application entitled Overload Release Mechanism, Serial No. 19,910 filed Mar. 12, 1979. The crank arms 72 and 71 will oscillate in unison with the follower shafts 49 and 52 unless a significant obstacle is encountered at which point the overload release mechanism will uncouple the shafts 49 and 52 from the respective crank arms 72 and 71. Each crank arm 71 and 72 carries a roller pin 73 at its outer periphery. The roller pins 73 extends into the horizontally extending slots 74 in elements that are affixed to the carriage assembly 67 (FIG. 2). Thus, as the crank arms 71 and 72 oscillate, the cooperation of the rollers 73 with the slots 74 will cause the carriage assembly 67 and elements supported by it to move in a vertical direction.

The crank arm 75 is also affixed by means of a overload release mechanism, indicated generally by the reference numeral 77, to the follower shaft 51. The crank arm 75 has a hub portion 76 which is journaled on a pilot portion 78 of the follower shaft 51. The hub portion 76 and follower arm 75 are fixed axially relative to the shaft 51 by means of a retainer plate 79 and socket-headed screws 81. A plurality of detent members 82 are slideably supported in axially extending bores 83 formed in the hub portion 76. The detent members 82 are loaded and urged axially by springs 84 that are contained in the bores 83 and are compressed between the retainer plate 79 and the detent members 82. The detent members 82 cooperate with recesses 85 formed in a plate 86 that is affixed for rotation with the follower shaft 51 by means of pins 87.

When no overload conditions occur, the detents 82 will remain in the recesses 85 and couple the hub 76 and crank arms 75 for oscillation with the follower shaft 51. If an overload condition occurs due to the supporting element 69 or one of the grippers 21 through 28 contacting a fixed obstacle, the springs 84 will yield so as to permit the detent 82 to move out of the recesses 85 and permit the follower shaft 51 to oscillate without effecting a horizontal movement of the grippers 21 through 28. When the obstacle is removed, the detents 82 will reengage the recesses 85 so as to re-establish the driving connection. As has been previously noted, overload release devices may be provided between the follower shafts 49 and 52 and the relative crank arms 72 and 71 for functioning in a similar manner.

The crank arm 75 has a roller follower 91 journaled at its outer extremity. The roller follower 91 is received in a vertically extending slot 92 formed in a member 93 which is affixed in any suitable manner to the supporting element 69. As the crank arm 75 oscillates, the roller follower 91 will cooperate will the slot 92 so as to effect reciprocation of the supporting element 69 and grippers 21 through 28 along a horizontal axis. It should be noted that the connection between the roller follower 91 the slot 92 accommodates the vertical movement of the supporting element 69 and grippers 21 through 28 which is produced by the vertical movement of the carriage 67, as aforedescribed. That is, the vertical orientation of the slot 92 permits the carriage 67 and supporting element 69 to move vertically relative to the crank arm 75 without effecting any movement in the horizontal direction. The horizontal movement is controlled completely by the oscillation of the crank arm 75 as controlled by the cam 47 and follower assemblage 58.

OPERATION

The figures illustrate the apparatus in its home position. As has been noted, in this position the grippers 21 through 28 will be positioned between adjacent of the work stations 12 through 19. The motor 35 may either be driven continuously in which case the cams 43, 47 and 48 will all be in a dwell condition, or the motor 35 may be operated only during the transfer cycle. Either construction and the electrical and mechanical apparatus for achieving it are believed to be obvious to those skilled in the art, and for that reason such structure has not been illustrated nor will it be described further.

Upon initiation of the transfer cycle the rotation of the cam shaft 37 causes the cams 43 and 48 to enter an active position so that the follower assemblies 57 and 59 will rotate as will the respective crank arms 71 and 72. The co-action of the roller followers 73 with the grooves 74 will cause the carriage assembly 67 and the grippers 21 through 28 carried thereby to be elevated. The cam 47 preferably is maintained in its dwell condition until the carriage assembly 67 is at its uppermost position.

Continued rotation of the cam shaft 37 then causes the roller cams 43 and 48 to enter a dwell cycle and the cam 47 to enter its active cycle. Initial actuation causes rotation of the follow assembly 57 and shaft 51 so that the crank arm 75 rotates in a direction to cause the carriage 69 to be moved to the left as seen in FIG. 1. Simultaneously, the cylinders 32 will actuate so as to open the jaws 29 and 31 of the respective grippers 21 through 28. Movement of the carriage 69 continues until the grippers 21 through 28 are positioned at the work stations 12 through 19 respectively.

The cam mechanism now causes the cam 47 to enter its dwell cycle and the cams 43 and 48 to move so that the crank arms 71 and 72 will rotate in the opposite direction so as to lower the grippers 21 through 29 into proximity to the work pieces at the stations 12 through 19. When this movement is completed, as may be sensed by timer cams or the like, the cylinders 32 are actuated so that the gripping device 21 through 28 will grasp the work pieces at the stations 12 through 19.

The cams 43 and 48 are configured to cause the crank arms 71 and 72 to rotate back in the opposite direction so that the carriage assembly 67 is raised again to its uppermost position. At this time, the cam 47 is in a dwell cycle.

After the gripping device 21 through 28 and the work pieces gripped thereby have been elevated, the cams 43 and 48 return to a dwell portion of their cycle and the cam 47 causes the crank arm 75 to rotate and move the support 69 so that each work piece will be brought into registry with the next adjacent work station. That is, the work pieces are moved from station 12 to 13, from 13 to 14, and so forth.

Once the work pieces are above the next adjacent work station, the cam 47 reenters its dwell cycle and the cams 43 and 48 are operative to pivot the crank arms 71 and 72 and lower the carriage assembly 67. When at the bottom of this movement, the cylinders 32 are again actuated so as to release the work piece from the jaws 21 through 28. When the work pieces have been deposited, the continued rotations of the cam shaft 37 causes the cams 43 and 48 to be first operative to raise the carriage assembly 68 and the cam 47 is operative to return the carriage 69 to its home position. The cams 43 and 48 then lower the complete carriage assembly to its home position.

It is to be understood that the described cycle of operation and range of movement is only one type which is possible with the described apparatus. By suitable configuration the grooves of cams 43, 47 and 48, other motion sequences may be accomplished. The manner of achieving this is believed to be obvious to those skilled in the art. It is also to be understood that the improvement described is a preferred embodiment of the invention, but that various modifications may be made without departing from the scope and spirit of the invention as defined by the appended claims.

I claim:

1. A material handling device for moving a work piece in succession between a plurality of adjacent work stations positioned in aligned relationship, said material handing device comprising a plurality of gripping means each adapted to selectively grip and release a work piece, a support, means for affixing said gripping means to said support, and motion transfer means for moving such support and said gripping means carried thereby from a home position in which said gripping means are positioned in aligned relation with the work stations and between the adjacent work stations, to a first operative position having at least a component of movement along the aligned path in which a work piece may be grasped at each work station, a second operative position having at least a component of movement along the aligned path wherein said gripping means move the work pieces gripped thereby from the first work stations to the next adjacent work stations for deposit upon release of said gripping means, and back to said home position between the work stations.

2. A material handling device as set forth in claim 1 wherein the motion transfer means includes first cam means for moving said gripping means in a first sense along the aligned path and second cam means for moving said gripping means in a second sense.

3. A material handling device as set forth in claim 2 wherein the support comprises a supporting element to which said gripping means are affixed, a carriage moveable in the first sense of movement parallel to the aligned path and fixed against movement in the second sense, and means for slideably supporting said supporting element on said carriage for movement relative to said carriage in the second sense, said slideable support being effective to preclude movement of said supporting element relative to said carriage in the first sense.

4. A material handling device as set forth in claim 3 wherein the first sense of movement is in a horizontal plane and the second sense of movement is in a vertical plane.

5. A material handling device as set forth in claim 4 wherein the first cam means comprises a pair of spaced roller cams driven by a common cam shaft and further including follower means cooperating with said first and said second cams, and first and second rocker arms operated by said follower means and cooperating with said carriage for moving said carriage in the first sense of movement upon pivotal movement of said first and second rocker arms.

6. A material handling device as set forth in claim 5 wherein the second cam means comprises a third roller cam fixed for rotation with said cam shaft, follower means cooperating with said third roller cam for rotating a third rocker arm, and means providing a connection between said third rocker arm and said supporting element for moving said supporting element in said second sense upon pivotal movement of said third rocker arm.

* * * * *